US009911085B2

(12) United States Patent
Oxenham et al.

(10) Patent No.: US 9,911,085 B2
(45) Date of Patent: Mar. 6, 2018

(54) VENUE SEAT AND FEATURE MAP (75) Inventors: Oliver Oxenham, Singapore (SG); Wesley Allan Oxenham, Singapore (SG)

(73) Assignee: EBAY INC., San Jose, CA (US)

( * ) Notice: Subject to any disclaimer, the term of this patent is extended or adjusted under 35 U.S.C. 154(b) by 246 days.

(21) Appl. No.: 13/560,001

(22) Filed: Jul. 27, 2012

(65) Prior Publication Data

US 2014/0032377 A1    Jan. 30, 2014

(51) Int. Cl.
*G06Q 10/02* (2012.01)
*G06Q 30/06* (2012.01)

(52) U.S. Cl.
CPC ......... *G06Q 10/02* (2013.01); *G06Q 30/0601* (2013.01)

(58) Field of Classification Search
CPC .............................. G06Q 30/00; G06Q 10/00
USPC ........................................................ 705/27.2
See application file for complete search history.

(56) References Cited

U.S. PATENT DOCUMENTS

| | | | |
|---|---|---|---|
| 2007/0136086 A1* | 6/2007 | Luerssen | 705/1 |
| 2009/0063206 A1* | 3/2009 | Payne et al. | 705/5 |
| 2009/0319306 A1 | 12/2009 | Chanick | |
| 2011/0099092 A1 | 4/2011 | Gibson et al. | |
| 2011/0153193 A1* | 6/2011 | Fox | G01C 21/20 701/533 |
| 2011/0173032 A1 | 7/2011 | Payne et al. | |
| 2011/0184945 A1* | 7/2011 | Das | G01C 21/206 707/724 |
| 2011/0313657 A1* | 12/2011 | Myllymaki et al. | 701/208 |
| 2012/0078667 A1* | 3/2012 | Denker et al. | 705/5 |
| 2012/0253663 A1* | 10/2012 | Hani | G01C 21/005 701/431 |
| 2013/0124234 A1* | 5/2013 | Nilsson et al. | 705/5 |
| 2013/0169673 A1* | 7/2013 | Garrett et al. | 345/629 |

OTHER PUBLICATIONS

International Search Report and Written Opinion dated Dec. 9, 2013 in related PCT Application No. PCT/US2013/051875 (6 pages).

* cited by examiner

*Primary Examiner* — Kathleen Palavecino
*Assistant Examiner* — Abby Flynn
(74) *Attorney, Agent, or Firm* — Maschoff Brennan (57) ABSTRACT Methods and systems are provided for helping a customer select seats when purchasing tickets, such as from an online ticket seller. A venue map can be provided to help the customer select the seat. The venue map can show the different seating areas and their relationship to an attraction area, such as a stage, game court or field. The venue map can also show features of the venue. For example, the venue map can show wheel chair accesses, restaurants, drink stands, playgrounds, stores, parking lots, restrooms, and the like. Ticket prices for each seating area can be provided, either on the map or elsewhere. Thus, a customer can use the map to determine which seats the customer desires for a particular event.

20 Claims, 4 Drawing Sheets

VENUE SEAT AND FEATURE MAP

BACKGROUND

Technical Field

The present disclosure generally relates to electronic commerce and, more particularly, relates to the use of an enhanced venue seat map for the selling of event tickets, such as for concerts and sporting events.

Related Art

The online purchasing of tickets for various events is common. For example, tickets for concerts and sporting events can be purchased from an online ticket seller, such as StubHub, Inc. The tickets can be paid for via a payment provider account, such as that offered by Paypal, Inc. After being paid for, the purchased tickets can then be mailed to the customer or can sometimes be printed by the customer.

Typically, a customer must select one or more seats when purchasing such tickets. Whether the tickets are being purchased online or from a brick and mortar merchant, a venue map is generally provided to help the customer select the seats. The venue map usually shows the different seating areas and their relationship to an attraction area, such as a stage, game court, or field. Ticket prices for each seating area are provided, either on the map or elsewhere. Thus, a customer can use the venue map to help determine which seats the customer would like to purchase for a particular event.

For example, a more dedicated football fan may be willing to pay more for seats closer to the field than a less dedicated football fan. Further, the venue map can help a customer decide what part of the field the customer wants to be near. The more dedicated football fan may prefer to be close to center field.

SUMMARY

According to an embodiment, a venue seat and feature map can be provided to help the customer select seats at a concert, sporting event, or the like. The map can show the different seating areas and their relationship to an attraction area, such as a stage, game court, or field. The map can also show various features of the venue. As used herein, the term "feature" can refer to an aspect of the venue other than a seating area or the attraction area.

For example, the venue map can show features such as elevators, escalators, wheel chair accesses, restaurants, drink stands, playgrounds, stores, parking lots, restrooms, and the like. The customer can use the map to determine which seats the customer desires for a particular event. For example, a user who is purchasing tickets for a party that includes a person in a wheelchair may prefer to be seated near an elevator and/or where wheelchair ramps make ingress and egress easier. As a further example, a user with children may want to be near a playground.

According to an embodiment, an online ticket selling system can comprise a memory for storing information regarding a plurality of events. The information can include venue maps for the events. The information can include venue features that can be selected and shown on the maps. The venue features can be stored as text, graphics (icons, logos, etc.), codes, or in any other fashion. Inclusion of the features on the maps can better help a user decide where to sit. The user can decide which of the features are to be displayed on the maps and how the features are to be shown.

According to an embodiment, one or more processors can receive a communication including an indication of a desire of a user to purchase event tickets for a specified event. The processor(s) can determine, via the memory, a corresponding map for the event and can send the map to the user. The map can show seats, an attraction area, and at least one venue feature. The map can be sent to a computer or mobile device of the user, for example.

According to an embodiment, the processor(s) are operable to determine, from the memory, which features are available at a particular venue. Thus, when a user specifies a venue (or an event, which then determines the venue), the processor(s) can determine which features are available at the specified venue. Not all of the features of a particular venue are necessarily available for every event of that same venue. Thus, some venue features may be available for one event, but not for another event. For example, playgrounds may be available for events that are commonly attended by children and the playgrounds may not be available for events that are not commonly attended by children. As a further example, beer concessions may be available for events commonly attended by adults and may not be available for events that are primarily intended for minors. Further, some features can be under repair or closed for some other reason. Thus, it is beneficial for the user to know what features will be available for a particular even.

According to an embodiment, the venue features can be selected by the user to be shown on the venue map. For example, the map can include a list of features which can be selected by the user to be shown on the map. The list of features for selection by the user can be presented as an overlay, cutout, drop down menu, or in any other manner. The list of features can be presented either with (or upon) the map or can be presented separately from the map. The list of features can be presented either on the same web page as the map or can be presented on a different web page from the map. The user can determine the visual appearance of the features that are displayed on the map.

According to an embodiment, the processor(s) can receive a communication from the user that includes a selection of which ones of the plurality of venue features are to be shown on the map. The communication can contain a list of venue features that are to be shown on the map. The list can be created by the user and communicated to the processor(s) in any desired manner. For example, the processor(s) can cooperate with an app of the user to communicate the list of features to be shown on the map from a user device to the processor(s). The user can select the features from a list provided by the app. The user can select the features from a list provided by the app prior to requesting the map, such that the map shows the desired features when the map is initially provided to the user. The app can store and maintain, e.g., update, the list of features that are available for each event.

According to an embodiment, the user can select the features from a list provided by the app prior after receiving the map. Thus, the map can initially lack the desired features. The map can be modified to add or remove features, as desired by the user. The list of features can be provided to the app by a ticket server.

According to an embodiment, a method can comprise storing, in a memory, information regarding a plurality of events. The information can include venue maps for the events and venue features for the maps. The method can comprise receiving, via the processor(s), a communication including an indication of a desire of a user to purchase event tickets for a specified event. The method can include determining, via the processor(s), a corresponding map for the event and sending, via the processor(s), the corresponding map to the user. The user can select the features from a list provided by the app prior to requesting the map, such that the map shows the desired venue features when the map is initially provided to the user. The map can show seats, an attraction area, and at least one venue feature. The map can show any desired number of venue features, as specified by the user.

According to an embodiment, computer readable and executable code for instructing the processor(s) to perform the method can be recorded on a non-transitory computer readable medium. For example, the method can be recorded on a hard drive, a solid state drive, magnetic tape, or optical storage media. The method can be recorded on any desired type of non-transitory computer readable medium.

DETAILED DESCRIPTION

Methods and systems are provided for helping a customer select a seat when purchasing such a ticket, according to an embodiment. The ticket can be purchased online, for example. A venue seat and feature map can be provided to help the customer select the seat. The map can show the different seating areas and their relationship to an attraction area, such as a stage, game court, or field. The map can also show features of the venue. As used herein, the term "feature" can refer to an aspect of the venue other than a seating area or the attraction area.

For example, the map can show features such as wheel chair accesses, restaurants, drink stands, playgrounds, stores (such as souvenir stores), parking lots, restrooms, and the like. Ticket prices for each seating area can be provided, either on the map or elsewhere. Thus, a customer can use the map to determine which seating area or which specific seats the customer desires for a particular event.

Figure 1:
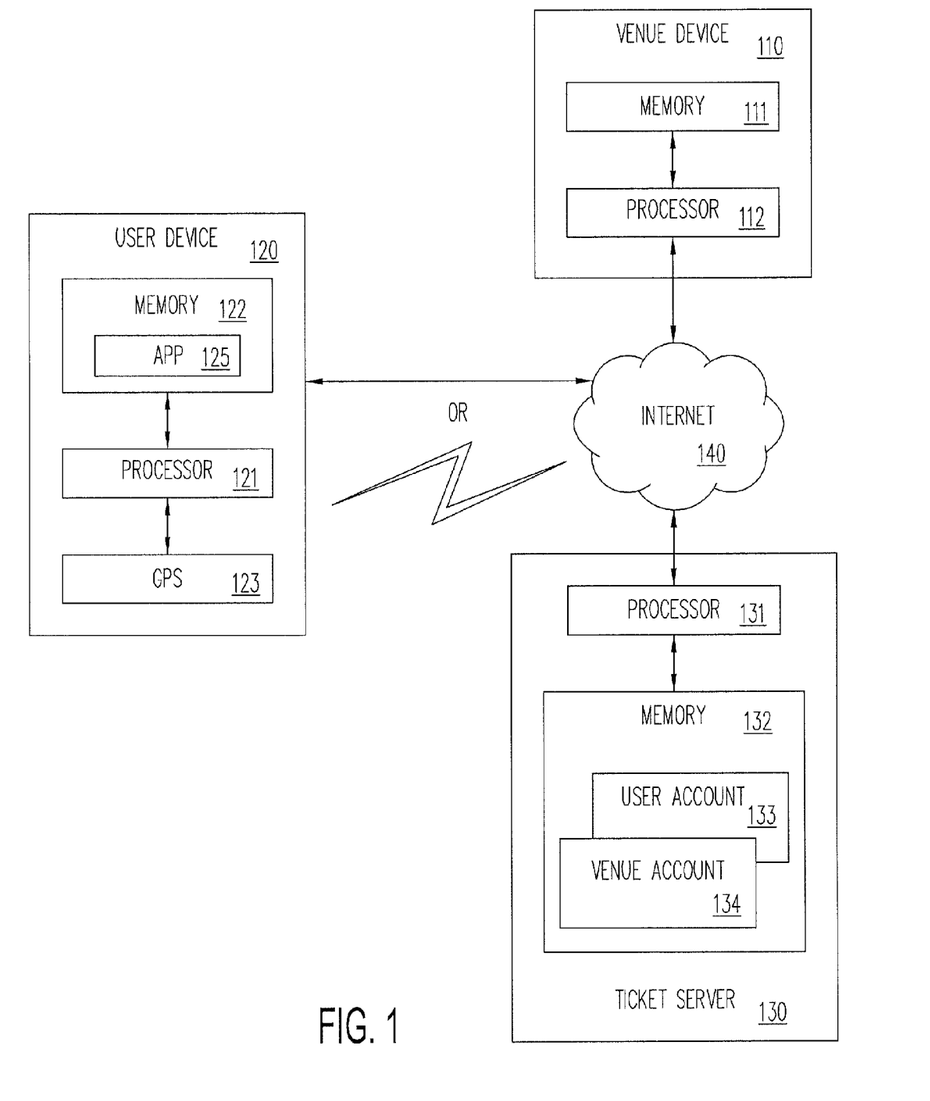
FIG. 1 is a block diagram of a system for providing a venue seat and feature map, according to an embodiment.

FIG. 1 is a block diagram showing a venue seat and feature map system, according to an embodiment. A venue device 110 can be present at each of a plurality of different event venues. The venue device 110 can provide information regarding events scheduled to be at the venue, regarding seating at the venue, and regarding features of the venue. The venue device 110 can provide such information to a ticker server 130. The ticket server 130 can obtain information regarding events scheduled to be at various venues, information regarding seating, and information regarding features of the various venues from other sources.

The venue device 110 can be a computer, a server, a computing tablet, or a mobile device, for example. The venue device 110 can have a processor 111 and a memory 112. The processor 110 can execute a software program stored in the memory 112 for providing information regarding events scheduled to be at the venue, regarding seating, and regarding features of the venue. The venue device 110 can provide such information to the ticket server and/or to a user device 120.

The venue device 110 can be disposed at the venue. The venue device 110 can be disposed at a location other than the venue. Each venue can have a dedicated venue device 110. A plurality of different venues can share a common venue device 110. For example, co-owned venues can share a common venue device 110.

The user can have the user device 120. The user device 120 can be a mobile device such as a cellular telephone, a tablet computer, a laptop computer, or the like. The user device 120 can be a non-mobile device such as a home (land line) telephone, a table top computer, an interactive set top box, or the like. The user device 120 can be any device or combination of devices that facilitate online ticket purchasing.

The user device 120 can have a processor 121, a memory 122, and a global positioning system (GPS) 123. The processor 121 can execute an application or app 125 that facilitates the venue seat and feature map method disclosed herein. The app 125 can be stored in the memory 122. The app 125 can provide a graphical user interface (GUI) for the user when purchasing tickets online. The app 125 can be a dedicated ticket purchasing app. The app 125 can be part of another app, such as a Paypal payment provider app.

The user device 120 can communicate with the venue device 110 and/or the ticket server 130 via a network. For example, the user device 120 can communicate with the venue device 110 and/or the ticket server 130 via the Internet 140. The user device 120 can communicate with the Internet via either a wired connection or a wireless connection.

An online ticket seller, such as StubHub, Inc. can have the ticket server 130. The ticket server 130 can facilitate online ticket sells. The ticket server 130 can have a processor 131 in communication with a memory 132. The processor 131 can be one or more processors. The processor 131 can access a user account 133 and a venue account 134 that are stored in the memory 132. The user account 133 can include information regarding the user, e.g., identification information, preferences, account numbers, and purchase history. The venue account 134 can include information regarding the venue, e.g., information regarding events, seating, and features. The memory 132 can be separate from the ticker server and can have any number of user accounts 133 and venue accounts 134. The memory 132 can be distributed, e.g., have portions thereof disposed at a plurality of different locations.

The ticket 130 server can be one or more servers located at one or more locations. Thus, the ticket server 130 can be geographically and operationally distributed. The ticker server 130 can be part of another system, such as a payment provider system.

The venue device 110 can communicate with the ticket server 130, such as via a network. For example, the venue device 110 can communicate with the ticket server 130 via the Internet 140. The venue device 110 can communicate with a plurality of different the payment servers 130. The ticket server 130 can communicate with a plurality of different the venue devices 110. A plurality of different ticket servers 130 can communicate among themselves and can be considered herein as being the same as a single ticket server 130. The user can utilize the user device 120 to interact with the ticket server 130 so that the user can purchase tickets online.

The ticket server 130 can communicate with the venue device 110 to obtain information regarding the venue. For example, the ticket server 130 can communicate with the venue device 110 to obtain information regarding the scheduling of events at the venue and regarding features of the venue. The features of the venue can be dependent upon the events of the venue, e.g., the features of the venue can vary from event to event.

Figure 2:
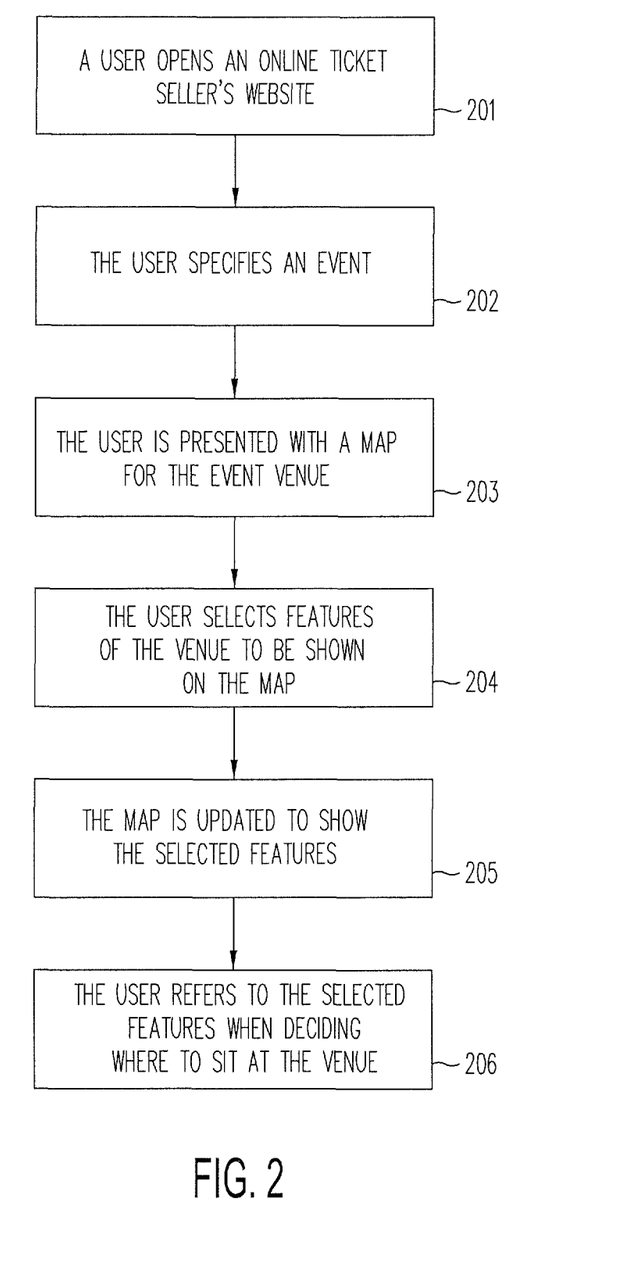
FIG. 2 is a flow chart showing a method for providing the venue seat and feature map, according to an embodiment.
Figure 3:
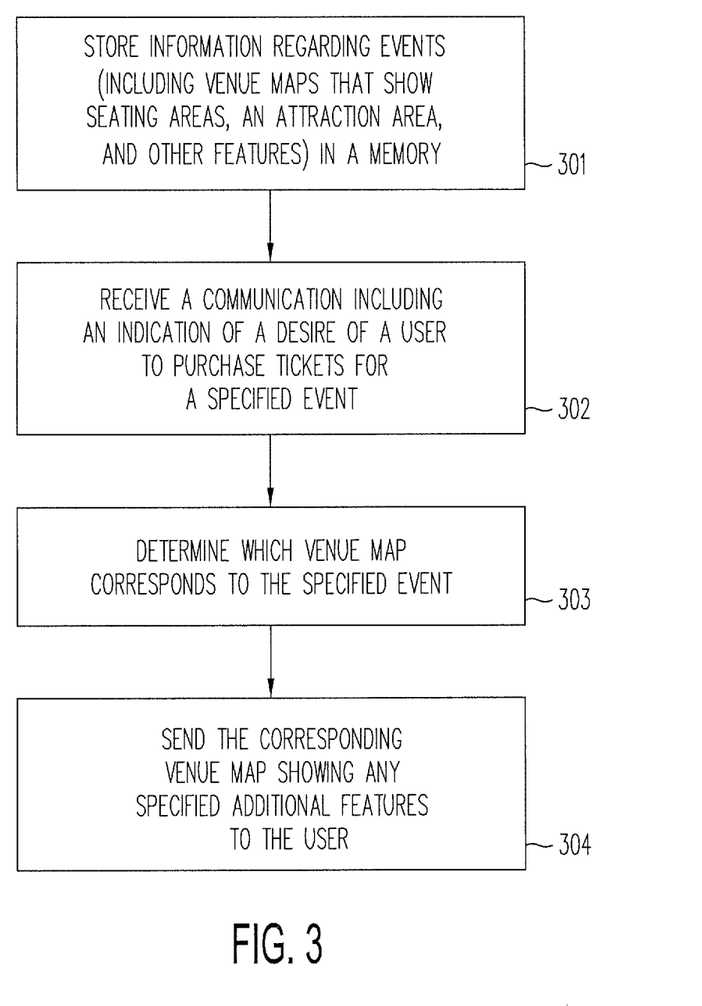
FIG. 3 is a flow chart showing further detail of the method for the venue seat and feature map, according to an embodiment.

FIGS. 2 and 3 are flow charts that describe examples of operations of the venue seat and feature map system according to embodiments thereof. Note that one or more the steps described herein may be combined, omitted, or performed in a different order, as desired or appropriate.

FIG. 2 is a flow chart showing a method for providing the venue seat and feature map, according to an embodiment. A user who wants to purchase one or more tickets for an event can open an online ticket seller's website, as shown in step 201, or access a ticker seller's mobile application on a user mobile device. The user can open the ticket seller's website using the user device 120, for example. The ticket seller's website can be hosted on the ticket server 130, the venue device 110, or on any other server or device.

The user can specify an event, as shown in step 202. The event can be a concert, sporting event, or any other type of event for which tickets are sold. The event can be specified by stating a name of the event, a venue, and/or a date. For example, the event of Metallica concert at Pacific Amphitheatre on Jun. 6, 2012 can be specified by entering "Metallica", "Pacific Amphitheatre" and/or "Jun. 6, 2012" in one or more entry boxes of the web site or app.

If the information entered is insufficient to uniquely identify the event, then the web site can present the user with a list of possible events. For example, if the user only entered "Metallica" without stating a date or venue, then a list of upcoming Metallic concerts (tour dates) can be presented for the user to choose from. In this way, the user can quickly find the event for which tickets are desired.

The user device 120 can provide GPS location information to the ticket server 130 and the ticket server 130 can be configured to limit the venues to one or more venues that are close to the location of the user device 120 when the user is attempting to specify the event. For example, if the user merely enters the word "Metallica" to identify an upcoming event and the GPS 123 of the user device 120 indicates that the user is in Los Angeles, then the ticket server 130 can present the user with the closest Los Angeles venue or all of the venues in Los Angeles.

The user can optionally be presented with only the next relevant event in the user's area. For example, if the user merely enters the word "Metallica" to identify the upcoming event, then the user can be presented with only the next Metallica concert at the closest venue to the user. The user can then be requested to verify that the desired event is being presented.

After the event has been uniquely identified, the user can be presented with a map for the event venue, as shown in step 203. The map can be shown on the web site. The map can show the different seating areas and their relationship to the attraction area, e.g., the stage, game court, or field. The map can be printed by the user, if desired. The ticket prices for each seating area can be provided.

The map can also show at least one venue feature. For example, the map can show escalators, elevators, wheel chair accesses, restaurants, drink stands, playgrounds, stores, parking lots, restrooms, and the like. The map can also show any desired features or combination of desired features. Displayed feature(s) can be a subset of all available features at the venue and can be selected by the user or the service provider. For example, the user may see a display that allows the user to select desired feature(s) for display, such as from a list or drop-down menu. The service provider may determine which feature(s) to display or show the user recommended feature(s) to display so that the user can select which one(s) to display. For example, the service provider may know, from previous user purchases at this venue, similar venues/events, or in general, that the user likes to sit near restroom locations, drink stands, and souvenir shops.

The map can show a best route from a selected seat to a feature. For example, the map can show a best route from a selected seat to a parking area that is designated for use by the ticket holder for that seat. As a further example, the map can show a best route from a selected seat to the nearest restroom. The best route can be defined as the shortest route.

The best route can be defined by the user according to any desired user criteria. For example, the map can show a best route for a party that includes a person in a wheelchair. Such a best route can take advantage of elevators and wheel chair ramps. As a further example, the map can show a best route that passes by a restroom.

The map can show a best route from a selected seat to an alternate feature. For example, if the user knows that the lines are likely to be long at the closest restroom, then the user can have the best route to the next nearest restroom shown on the map.

The map can show alternate routes from a selected seat to a feature. For example, if the user knows that the shortest route to a drink stand is likely to be congested, then the user can have an alternate route, e.g., the next shortest route, to the same drink stand displayed.

The best route can be determined by the ticket server 130 and can be communicated to the user device 120. Alternatively, the best route can be determined by the user device 120. As a further alternative, the best route can be determined by the venue device 110. The best route can be determined by any desired device according to any desired criteria.

The user device 120 can be a mobile device and the map, as well as any or all of the features, can be stored on the user device 120. For example, the map can be used during the event to determine the location of a feature, the location of an alternative feature (such as the next closest restroom when the closest restroom is full), the best route to a feature, or the next best route to a feature.

The user can mark locations on the map, as desired. For example, the user can mark, highlight, or drop a pin on the location of a friend's seat elsewhere in the venue. The user can mark any desired location on the map. The user can mark locations on the map for any desired purpose. For example, the user can mark locations on the map to show were features are located or to define the starting points and ending points of routes.

GPS or another location service or combination of services can provide instructions to the user for finding features or for following routes. For example, the app 125 of the user device 120 can provide verbal instructions, such as via earphone, for the user to follow such that the user does not need to view the map as the user moves about the venue. In this manner, the user can often view the event rather than look at the user device 102.

The map can show best routes or alternate routes from one feature to another feature. The map can show best routes or alternate routes from any place at the venue to any other place at the venue. The user can designate a starting point and an ending point for any such routes, such as by dropping pins on the map as displayed on the user device 120.

The user device 120 can be a mobile device and the map can be updated in real time. Thus, the map can be used in real-time to determine the which feature to visit and can be used in real time to determine the best or an alternate route to the feature. Which feature to visit can be determined by taking into consideration factors such as brand preference (e.g., Coca Cola vs. Pepsi) and waiting lines. Brand preferences can be entered by the user during a setup process. The map can be updated in real time to show the status of features. For example, if a drink stand closes or runs out of inventory, a note can be provided on the map.

The map can be interactive. For example, in response to the user making a change on the map, such as adding or deleting a feature, the app 125 or the ticket server 130 can suggest one or more other changes. For example, if the user deletes a beer concession, the app 125 or the ticket server can suggest a nearby soft drink concession to be added.

The system can be anticipatory. For example, in response to the user adding a beer concession to the map, the app 125 or the ticket server 130 can suggest that a nearby restroom also be added. Thus, the system can determine future needs of the map based upon current use of the map.

The best route to a selected one of the features can be determined by taking into consideration such factors as distance to the feature and foot traffic congestion (as reported by human operators and/or machine vision). Any preferences regarding routing can also be considered. For example, the user can specify that all routes be less than a predetermined distance. The user might want to specify short routes of the user is disabled, unable to walk longer distances, or simply prefers to walk shorter distances.

The app 125 can use the GPS 123 and the clock of the user device 120 to determine that the user is at the venue. Prior to the event, the app 125 can automatically offer to show the user where to park, how to get to the seats, and where features such as the nearest concession stands and restrooms are, for example. After the event, the app 125 can offer to show the user the route to the parking lot, the nearest freeway, a destination (such as the user's home), or any other place.

The map can be a photographic map or virtual map. The map can thus show the actual features or a simulation of the actual features. The photographic may can be updated, such as in real time. The virtual map can be photorealistic.

The user can specify which venue features are to be shown on the map, as shown in step 204. The user can specify which venue features are to be shown on the map prior to the map being displayed on the web site. For example, the user can specify which venue features are to be shown on the map via the use of a menu, such as a drop down menu of the app 125. The user can specify which venue features are to be shown after the map is displayed by the web site. For example, the user can specify which venue features are to be shown on the map via the use of a drop down menu that is provided on the map or along with the map. The venue features can be specified iteratively. That is, the venue features can be changed repeatedly until the user is satisfied with the features displayed.

The map can be updated to show the selected features, as shown in step 205. Thus, each time that the user changes the features that are selected to be shown on the map, the map can be updated to show the newly selected features. Such updating can be facilitated via communication between the user device 120 (from which the features can be selected) and the ticket server 130 (which can add the features to the map of the website displayed on the user device 120.

Alternatively, the ticket server 130 can download the map and all of the features to the user device 120 and the map can be changed by the user device 120 without requiring the continued cooperation of the ticket server 130. For example, an app 125 executed in the user device, a Java applet, or the like can facilitate changing of the features shown on the map without involvement of the ticket server 130. In this manner, network traffic can be minimized, bandwidth efficiency can be enhances, and the bandwidth requirements of the device 120 and/or the app 125 can be reduced.

The user can refer to the selected features when deciding where to sit at the venue, as shown in step 206. Thus, the user can display the features that are important to the user for deciding where to sit at a venue. The user can then determine which seats are close enough to those features to be desirable to the user and can select the seats on this basis. For example, if the user is going to bring children to the event, then the user may want to select seats near a playground. As a further example, if the user intends to eat during the event, the user may want to be near a restaurant, possible a particular restaurant such as a hotdog stand or pizza shop.

The user can specify that selected features be shown on the map only when grouped with a specified distance of one another. For example, the user can specify that the drink stands and restrooms be shown on the map only when the drink stands are within fifty feet of the restrooms.

Features such as restaurants and drink stands can be identified generically on the map. For example, the words "Restaurant" and "Drink Stand" can simply be used to indicate these features on the map. Alternatively, more descriptive terms can be used. For example, a name of the restaurant or a name of the products being sold can be shown on the map. For example, the words "Burger King Restaurant" or "Coca Cola Drink Stand" can be used. Any words, logos, designs, icons, or the like which indicate to the user what is at a location on the map can be used.

The user can choose to color code the features. For example, all food concessions can be color coded red, all drink concessions can be color coded blue, and all restrooms can be color coded green. Such color coding can help the user to quickly locate the desired feature, especially when the map is being displayed on the comparatively small screen of a mobile user device 120.

The user can define words, logos, designs, icons, or the like to be displayed upon the map for the features. Thus, the user can select such words, logos, designs, icons, or the like from words, logos, designs, icons, or the like presented by the website and/or can custom design words, logos, designs, icons, or the like for presentation on the map. For example, the user can select a Pepsi bottle from a list of graphic images to be used for all drink stands and can type the word "EATS" to be used for all restaurants. In this manner, the user can customize the maps, thus potentially making the event more appealing to the user and thereby increasing ticket sells for the online ticket seller.

The user can pre-define what features are to be shown on the map, such as during a setup process. This pre-definition of features to be shown on the map can then apply to all subsequently displayed maps. For example, the user can select restrooms and beer stands to be displayed on all future maps. Thus, any maps displayed by the venue seat and feature map in the future will automatically show the restrooms and beer stands in addition to the seating areas and attraction area.

The user can pre-define a plurality of different feature groups, such as during a setup process. Each feature group can contain a different set of features that are to be used for a different type of event. This, the user can pre-define one feature group for rock concerts and another feature group for monster truck rallies. For example, the user can pre-define one feature group containing drink stands and restrooms for the rock concerts and can pre-define another feature group containing playgrounds and souvenir shops for the monster truck rallies.

The venue seat and feature map system can automatically apply the pre-defined group for the user. Thus, when a map for a rock concert is being displayed, then the venue seat and feature map system can automatically apply the pre-defined group for rock concerts to the map. The user can then change which pre-defined group is to be used, if the user desires to do so. Alternatively, the user can select which pre-defined group is to be shown prior to the map being displayed.

This pre-definition of features to be shown on the map can then apply to all subsequently displayed maps. For example, the user can select restrooms and beer stands to be displayed on all future maps. Thus, any maps displayed by the venue seat and feature map in the future will automatically show the restrooms and beer stands in addition to the seating areas and attraction area.

Any such customization or pre-definition of features to be shown on a map can last indefinitely or can last for a pre-determined amount of time. Such customization or pre-definition of features to be shown on a map can last for a day, a week month, a season, a year, multiple years, or any other length of time. For example, a season ticket holder may set up a custom map for a baseball team that only applies when that particular baseball team is playing and that defines the features to be shown on the map and the words or graphics to be displayed to indicate each feature. Other custom maps can be used by the season ticket holder for basketball games and football games.

When the map is initially sent to the user, the map can show all of the features available for the event, some of the features available for the event, or none of the features available for the event. The user can subsequently define which of the features available for the event the user desires to see on the map and the map can be changed to show only the desired features.

The displayed features can also be dynamically changed by the service provider, based on purchases or other information from the user. For example, if a user has recently purchased seats for multiple sporting events in locations near family features, the service provider may show or recommend displaying family features on the user venue map, even though the user may have purchased seats in non-family areas in the past and/or previously selected non-family features for display, such as drink stands.

FIG. 3 is a flow chart showing further detail of the method for the venue seat and feature map, according to an embodiment. A ticket server 130 can store information regarding events in a memory 132, as shown in step 301. The information can include venue maps that show seating areas and an attraction area such as a stage, court or field. Information regarding features of the venue can be stored in the memory 132. For example, information regarding the location, routes to, and items sold by stores, drink stands, shops, and the like can be stored in the memory 132. Information regarding which events at the each venue will utilize such features can be stored in the memory 132.

The ticket server 130 can receive a communication that includes an indication of a desire of the user to purchase tickets for a specified event, as shown in step 302. For example, the user can open the app 125 on the user device 120. The app 125 can initiate communication with the ticket server 130. From the app 125, the user can select the event for which the user desires to purchase tickets. Generally, the event will be defined by specifying an attraction, e.g., a performer or a team, a venue, and/or a date.

The user can access a web site of the online ticket seller, with or without using the app 125. The user can select the event for which the user desires to purchase tickets, can specify the features, and can view the map via the web site.

The ticket server 130 can determine which map corresponds to the specified even, as shown in step 303. The ticket server 130 can determine which map corresponds to the specified event via a data base stored in the memory 132, for example. The ticket server 130 can send the map, showing any specified features, to the user as shown in step 304.

In implementation of the various embodiments, embodiments of the invention may comprise a personal computing device, such as a personal computer, laptop, PDA, cellular phone or other personal computing or communication devices. The online ticket seller may comprise a network computing device, such as a server or a plurality of servers, computers, or processors, combined to define a computer system or network to provide the online ticket sales.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Figure 4:
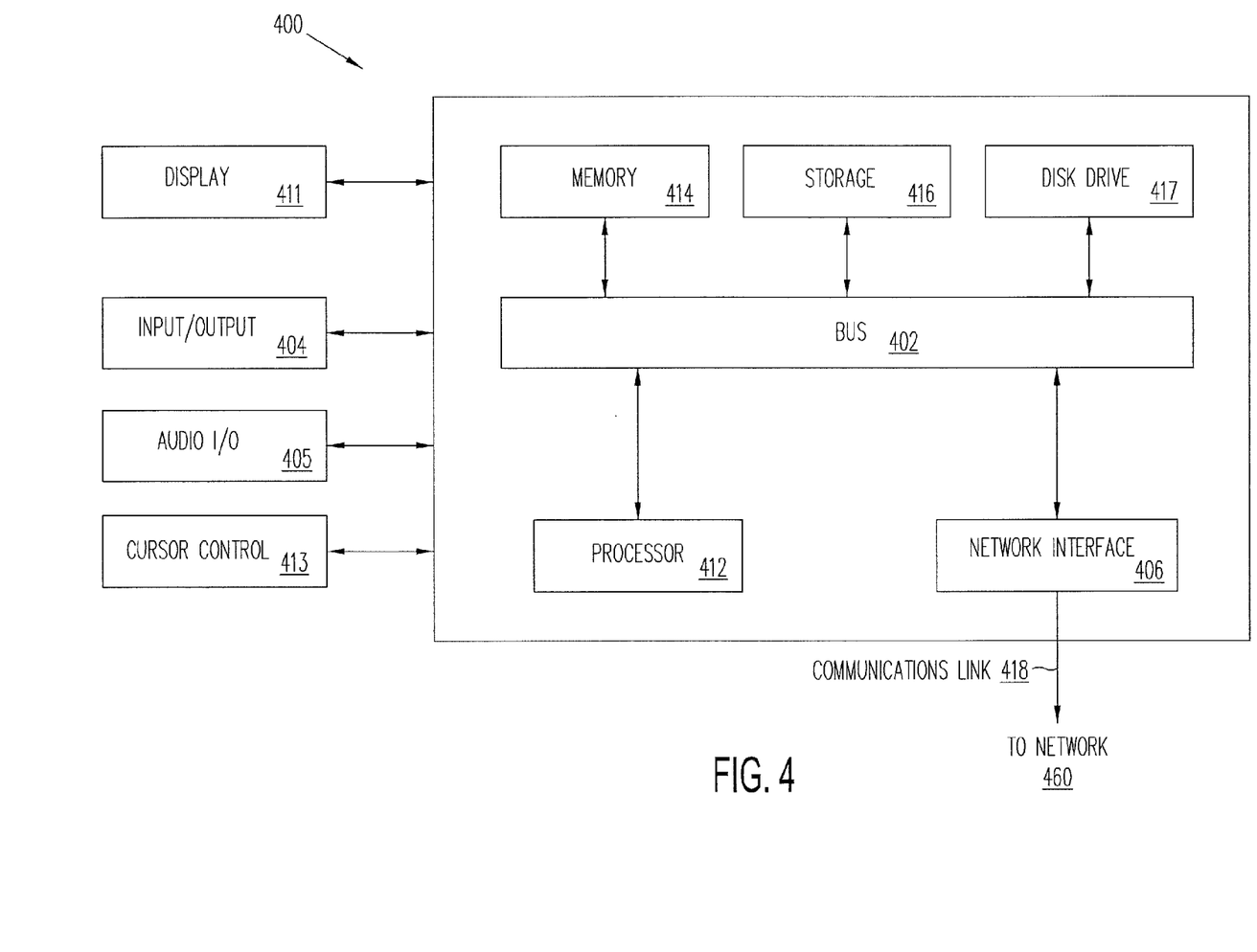
FIG. 4 is a block diagram of an example of a computer that is suitable for use in the system for real-time advertisement and negotiation, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "store" can include any business or place of business. The store can be a brick and mortar store or an online store. The store can be any person or entity that sells a product.

As used herein, the term "product" can include any item or service. A product can be anything that can be sold.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "attraction area" can include any area, stage, field, court, or other structure or area when performers, players, or the like perform or play. The term "attraction area" can include any place that the spectators desire to view at the venue.

As used herein, the term "game field/court" can include any field, court, arena, or other structure or area when a game is played.

As used herein, the term "restaurant" can include any restaurant, coffee shop, café, deli, sandwich shop, or any other place that sells food or beverages.

As used herein, the term "drink stand" can include any place where any beverage is sold.

As used herein, the term "playground" can include any place that has toys, swings, slides, or other things for children to play on or with. The term "playground" can be included any place where children are expected to play.

As used herein, the term "store" can include any souvenir shop, gift shop, or other place where a user can shop. As used herein, the term "store" can include any place where products are sold.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:
1. A system comprising:
   a non-transitory memory storing information regarding a plurality of events, including venue maps for the events and venue features for the venue maps; and one or more processors coupled to the non-transitory memory and configured to read instructions from the non-transitory memory to cause the system to perform operations comprising:
receiving, from a user device of a user, a communication including an indication of a desire of the user to purchase tickets for a specified event, wherein the indication comprises a first location of the user determined using a GPS system of the user device and a keyword of an upcoming event;
determining the specified event based at least on the first location and the keyword;
determining, via the non-transitory memory, a corresponding venue map for the specified event;
determining a preferred feature list of the venue features for the user based on previous user ticket purchases by the user;
processing the preferred feature list to remove closed features for the specified event from the preferred feature list to generate an available preferred feature list;
processing the preferred feature list to suggest additional features for the specified event from the preferred feature list;
sending the corresponding venue map and display data corresponding to all of the preferred features and all of the additional features to the user device for display on an application executing on the user device, wherein the user device is able to display the corresponding venue map and any of the preferred and additional features, and wherein the corresponding map and all the preferred and additional features are sent to the user device before receiving from the user device a second location of the user determined using the GPS system of the user device, the second location indicating the user is at the specified event;
receiving, from the user device, the second location of the user determined using the GPS system of the user device when the user attends the specified event;
determining route data for the application executing on the user device using the second location of the user, wherein the route data comprises a route to locate the venue features in a venue from the available preferred feature list and the additional features and instructions for the route in response to the user marking a selected venue feature of the venue features while at the venue;
communicating the route data to the user device for output to the user via the user device;
updating in real time the corresponding venue map on the user device as communicated by a ticket server based on the selected venue feature to display the route to locate the selected venue feature, wherein the corresponding venue map shows seats, an attraction area, and at least one user specified venue feature from the available preferred feature list; and
sending a notification to a display of the user device of at least one additional venue feature located along the route to the selected venue feature based at least in part on the selected venue feature.

2. The system of claim 1, wherein the operations further comprise:
determining, from the non-transitory memory, which of the venue features are available at the venue and to show on the corresponding map only those venue features that are available.

3. The system of claim 1, wherein the operations further comprise:
determining, from the non-transitory memory, which of the venue features are available at the venue for the specified event and to only show on the corresponding map those venue features that are available.

4. The system of claim 1, wherein the operations further comprise:
providing to the user a list showing a plurality of the venue features which can be selected by the user to be shown on the corresponding map.

5. The system of claim 1, wherein the venue map includes a list of the venue features which can be selected by the user to be shown on the corresponding map.

6. The system of claim 1, wherein the venue map includes a drop down menu that provides a list of the venue features which can be selected by the user to be shown on the corresponding map.

7. The system of claim 1, wherein the operations further comprise:
receiving a communication including a selection of which ones of a plurality of the venue features are to be shown on the corresponding map.

8. The system of claim 1, wherein the communication contains a list of the venue features to be shown on the corresponding map.

9. The system of claim 1, wherein the operations further comprise:
cooperating with an app of the user to communicate from the user to the one or more processors a list of the venue features to be shown on the corresponding map.

10. The system of claim 1, wherein the venue features are selected from the group comprising:
at least one wheel chair access;
at least one restaurant;
at least one drink stand;
at least one playground;
at least one store;
at least one parking lot; and
at least one restroom.

11. A method comprising:
receiving, via one or more processors, a communication including an indication of a desire of a user to purchase tickets for a specified event;
determining, via the one or more processors, a corresponding venue map for the specified event;
determining a preferred feature list of venue features for the user based on previous user ticket purchases by the user;
processing the preferred feature list to remove closed features for the specified event from the preferred feature list to generate an available preferred feature list;
processing the preferred feature list to suggest additional features for the specified event from the preferred feature list;
sending, via the one or more processors, the corresponding venue map and display data corresponding to all of the preferred features and all of the additional features to a user device for display via an application displayed through an output display device of the user device, wherein the output display device accepts menu selections of at least one of the available preferred feature list and the additional features for highlighting on the corresponding venue map displayed through the output display device, and wherein the corresponding venue map and all of the preferred and additional features are sent to the user device before receiving from the user device a second location of the user determined using a GPS system of the user device, the second location indicating the user is at the specified event;

receiving, from the user device, the second location of the user determined using the GPS system of the user device when the user attends the specified event;

determining route data for an application executing on the user device using the second location of the user, wherein the route data comprises a route to locate the venue features in a venue from the available preferred feature list and the additional features and instructions for the route in response to the user marking a selected venue feature of the venue features while at the venue;

communicating the route data to the user device for output to the user via the user device when the user marks a selected venue feature of the venue features while at the venue;

updating in real time the corresponding venue map on the user device as communicated by a ticket server based on the selected venue feature to display the route to locate the selected venue feature, wherein the corresponding venue map shows seats, an attraction area, and at least one user specified venue feature from the available preferred feature list; and sending a notification to a display of the user device of at least one additional venue feature located along the route to the selected venue feature based at least in part on the selected venue feature.

12. The method of claim 11, further comprising determining, via the one or more processors, which of the venue features are available at a venue for the specified event and showing on the corresponding venue map only those venue features that are available.

13. The method of claim 11, further comprising providing to the user, via the one or more processors, a list showing a plurality of the venue features which can be selected by the user to be shown on the corresponding venue map.

14. The method of claim 11, further comprising receiving, via the one or more processors, a communication including a selection of which ones of a plurality of the venue features are to be shown on the corresponding venue map.

15. The method of claim 11, further comprising cooperating between the one or more processors and an app of the user to communicate a list of the venue features to be shown on the corresponding venue map from the user to the one or more processors.

16. A non-transitory machine-readable medium having stored thereon machine-readable instructions executable to cause a machine to perform operations comprising:

receiving, via one or more processors, a communication including an indication of a desire of a user to purchase tickets for a specified event;

determining, via the one or more processors, a corresponding venue map for the specified event;

determining a preferred feature list of venue features for the user based on previous user ticket purchases by the user;

processing the preferred feature list to remove closed features for the specified event from the preferred feature list to generate an available preferred feature list;

processing the preferred feature list to suggest additional features for the specified event from the preferred feature list;

sending, via one or more processors, the corresponding venue map and display data corresponding to all of the preferred features and all of the additional features to a user device, such that the user device is able to display the corresponding venue map and any of the preferred and additional features, and wherein the corresponding venue map and all the preferred and additional features are sent to the user device before receiving from the user device a second location of the user determined using a GPS system of the user device, the second location indicating the user is at the specified event;

receiving, from the user device, the second location of the user determined using a GPS system of the user device when the user attends the specified event;

determining route data for an application executing on the user device using the location of the user, wherein the route data comprises a route to locate the venue features in a venue from the available preferred feature list and the additional features and instructions for the route in response to the user marking a selected venue feature of the venue features while at the venue;

communicating the route data to the user device for output to the user via the user device;

updating in real time the corresponding venue map on the user device as communicated by a ticket server based on the selected venue feature to display the route to locate the selected venue feature, wherein the corresponding venue map shows seats, an attraction area, and at least one user specified venue feature from the available preferred feature list; and sending a notification to the display of the user device of at least one additional venue feature located along the route to the selected venue feature based at least in part on the selected venue feature.

17. The non-transitory machine-readable medium of claim 16, wherein the operations further comprise determining, via the one or more processors, which of the venue features are available at a venue for the specified event and only showing on the corresponding venue map those venue features that are available.

18. The non-transitory machine-readable medium of claim 16, wherein the operations further comprise providing to the user, via the one or more processors, a list showing a plurality of the venue features which can be selected by the user to be shown on the corresponding venue map.

19. The non-transitory machine-readable medium of claim 16, wherein the operations further comprise receiving, via the one or more processors, a communication including a selection of which ones of a plurality of the venue features are to be shown on the corresponding venue map.

20. The non-transitory machine-readable medium of claim 16, wherein the operations further comprise cooperating between the one or more processors and an app of the user device to communicate a list of the venue features to be shown on the corresponding venue map from the user device to the one or more processors.

* * * * *